(12) United States Patent
Novaes

(10) Patent No.: US 7,333,486 B2
(45) Date of Patent: Feb. 19, 2008

(54) METHODS AND ARRANGEMENTS FOR MONITORING SUBSOURCE ADDRESSING MULTICAST DISTRIBUTION TREES

(75) Inventor: Marcos N. Novaes, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 794 days.

(21) Appl. No.: 09/906,593

(22) Filed: Jul. 16, 2001

(65) Prior Publication Data

US 2003/0012132 A1 Jan. 16, 2003

(51) Int. Cl.
*H04L 12/44* (2006.01)
(52) U.S. Cl. .................. 370/390; 370/408; 370/432
(58) Field of Classification Search ........ 370/216–221, 370/252, 254–256, 389, 390, 392, 400, 401, 370/242, 253, 432, 408
See application file for complete search history.

(56) References Cited

U.S. PATENT DOCUMENTS

| | | | | | |
|---|---|---|---|---|---|
| 5,289,460 | A | * | 2/1994 | Drake et al. | 370/245 |
| 5,295,154 | A | * | 3/1994 | Meier et al. | 370/351 |
| 5,355,371 | A | * | 10/1994 | Auerbach et al. | 370/255 |
| 6,134,599 | A | * | 10/2000 | Chiu et al. | 709/252 |
| 6,252,856 | B1 | * | 6/2001 | Zhang | 370/254 |
| 6,374,303 | B1 | * | 4/2002 | Armitage et al. | 709/242 |
| 6,446,125 | B1 | * | 9/2002 | Huang et al. | 709/226 |
| 6,707,796 | B1 | * | 3/2004 | Li | 370/254 |
| 6,728,205 | B1 | * | 4/2004 | Finn et al. | 370/217 |

* cited by examiner

*Primary Examiner*—Wing Chan
*Assistant Examiner*—Duc Duong
(74) *Attorney, Agent, or Firm*—Ference & Associates LLC

(57) ABSTRACT

Methods and arrangements for monitoring at least one interconnection between at least two nodes in a distributed network. At least one subscriber node is prompted to ascertain the integrity of an interconnection with at least one parent node.

15 Claims, 3 Drawing Sheets

METHODS AND ARRANGEMENTS FOR MONITORING SUBSOURCE ADDRESSING MULTICAST DISTRIBUTION TREES

FIELD OF THE INVENTION

The present invention relates generally to the field of digital communications, and more particularly to packet transmission systems involved in the management of multicast communications to a plurality of users.

BACKGROUND OF THE INVENTION

In the field of communication networks, the term multicast refers to a data package switching technology in which a single data packet is received by a plurality of nodes. This mode of transmission is specially usefull when several nodes in the network need to receive data packets which emanate from the same source. The multicast technology reduces the number of separate transmissions and data switching operations which are necessary to deliver a data package to a set of nodes in a communications network. The communications network contains specialized nodes which are called router nodes, or package switching nodes. Such nodes perform the package switching operation which route a given data package along the network towards a specific destination.

The multicast capability of a network is an extension of the point to point transmission infrastructure of the communications network. There are known to exist a number of network communication standards, the most prominent being the Internet Protocol (IP). Other protocols exist which are distinct to IP, such as Asynchronous Transfer Mode (ATM), or are an extension of the IP protocol. Similarly, several multicast protocols exist which implement the multicast capability which are designed for the several point to point transmission mode protocols. The most prominent of such multicast protocols are the implementations of multicast, which are integrated with the basic IP protocol. Some of these implementations have become standards, such as DVMRP and PIM, and yet others remain under discussion, such as MOSPF. (These are all currently existing multicast technologies, as defined by the IETF [Internet Engineering Task Force]. As DVMRP [Distance Vector Multicast routing Protocol] and PIM [Protocol Independent Multicast] are now standard, they are published as Internet Drafts by the IETF. As MOSPF [Multicast Open Shortest Path First Protocol] is still under discussion at the IETF, it is published as an RFC document [i.e., "Request for Comments"]. The references for these protocols are as follows: DVMRP—IETF Internet Draft; MOSPF—IETF RFC 1584; and PIM—IETF Internet Draft.)

Generally, it can be said that all the currently existing multicast protocols have one characteristic in common, which is the fact that they utilize the same addressing scheme as the underlying point to point protocol. This fact limits the addressing capability of the multicast protocol to that of the underlying point to point protocol. For example, this characteristic makes the protocols in question unsuitable in a scenario in which a data source needs to send a data package to a subset of all of its receivers. Since the number of all possible subsets of receivers of data from a given source grows exponentially with the number of receivers, conventional multicast technology tends to be inadequate for a variety of applications requiring a finer addressing capability.

Apart from the fact that each conventional multicast protocol is usually designed as an extension of the underlying point to point protocol, another important aspect of the design of existing multicast technology is that of the design and maintenance of the multicast distribution trees. A multicast distribution tree is a distributed data structure which includes a number of router nodes, a number of source nodes and a number of receiver nodes. Typically, multicast distribution trees are derived from the actual configuration of the routers of the underlying protocol. In most such protocols, two nodes in the distribution tree are only "neighbors" if they are physically connected by a communications link. In some implementations, a facility exits which allows for a human operator to create links in a multicast distribution tree between two nodes which are not physical neighbors. Such links are called multicast tunnels. The utilization of multicast tunnels has become a necessity in several applications in which users are interconnected by a communications network which does not support any form of multicast protocol. This problem is particularly serious at present, because the most widely utilized communication network is the universal internet, which was originally derived form the DoD (Department of Defense) ARPAnet and now is the most widely used private network, which spans the entire planet and has a number of users approaching one billion.

The Internet presently only supports the IP point-to-point protocol. The Internet has been unable to support the IP multicast standard because of the sheer size of the Internet. In such a scenario, it becomes very hard to deploy a protocol which builds distribution trees efficiently. Even if this problem could be solved in the near future, another problem, the coarseness of the IP multicast addressing scheme, will still be a limitation of the multicast capability. In case the nodes in the interconnecting network do not support a protocol of choice, it will most likely be necessary to utilize protocol tunnels. The manual configuration, i.e., the construction of multicast distribution trees by human operators, becomes impractical in Internet applications.

In view of the foregoing, several needs have been recognized, among which is a need to provide multicast distribution tree technology configured for efficiently and automatically constructing a multicast distribution tree for nodes which are separated by a network which does not support the specific multicast protocol.

SUMMARY OF THE INVENTION

In accordance with at least one presently preferred embodiment of the present invention, the problem of distributing data packages to a refined set of subscriber nodes is solved by the provision of a method for organizing a network of router nodes into a distribution structure which is termed a Subsource Addressing Multicast Tree. Contemplated herein are methods and arrangements for monitoring the reliability of the delivery of data packages to nodes in a distribution tree, as well as provisions for monitoring the quality of communication links among nodes of the distribution tree.

In summary, the present invention provides, in one aspect, a method of monitoring at least one interconnection between at least two nodes in a distributed network, the method comprising the steps of: designating at least one of the nodes as at least one subscriber node; designating a parent node for each subscriber node; and prompting at least one subscriber node to ascertain the integrity of an interconnection with at least one parent node.

In another aspect, the present invention provides an apparatus for monitoring at least one interconnection between at least two nodes in a distributed network, the apparatus comprising: an arrangement for designating at least one of the nodes as at least one subscriber node; an arrangement for designating a parent node for each subscriber node; and an arrangement for prompting at least one subscriber node to ascertain the integrity of an interconnection with at least one parent node.

Furthermore, in an additional aspect, the present invention provides a program storage device readable by machine, tangibly embodying a program of instructions executable by the machine to perform method steps for monitoring at least one interconnection between at least two nodes in a distributed network, the method comprising the steps of: designating at least one of the nodes as at least one subscriber node; designating a parent node for each subscriber node; and prompting at least one subscriber node to ascertain the integrity of an interconnection with at least one parent node.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
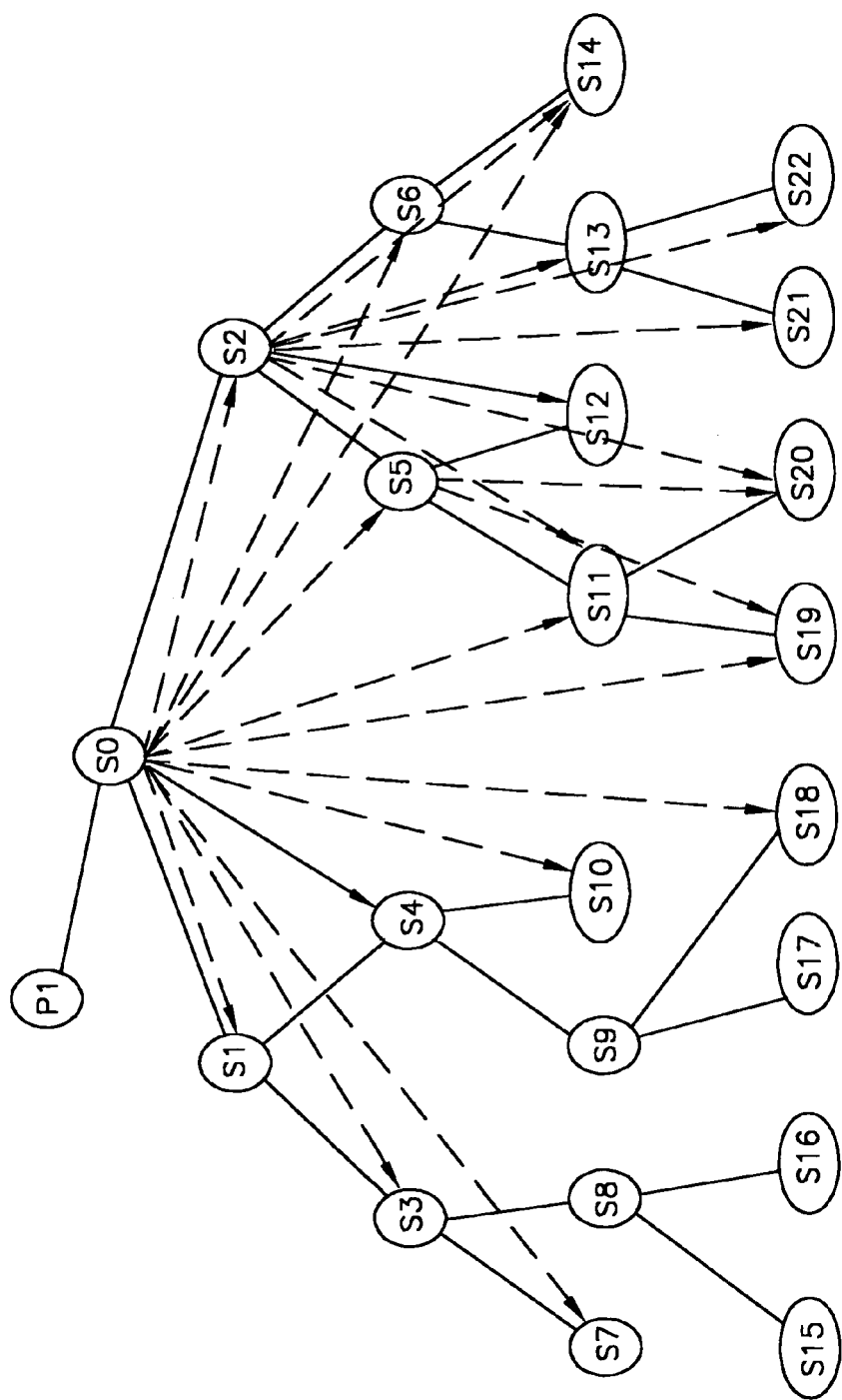
FIG. 1 schematically illustrates a distribution tree and some possible paths for data propagation.

Several other copending and commonly owned U.S. patent applications, filed concurrently herewith, disclose various processes and arrangements whose details may, in the role of background information, help provide a better understanding of one or more of the embodiments disclosed and contemplated herein. Accordingly, those applications are hereby fully incorporated by reference as if set forth in their entirety herein, and are as follows (including the title and application Ser. No. for each one): "Methods And Apparatus for the Propagation Of Multicast Transmissions In A Communications Network" application Ser. No. 09/906,928); "Methods and Apparatus for Updating Subsource Addressing Multicast Routing Records in a Communications Network" application Ser. No. 09/906.597); "Methods and Arrangements for Building a Subsource Address Multicast Distribution Tree Using Traced Routes" application Ser. No. 09/906,936); "Methods and Arrangements for Building a Subsource Address Multicast Distribution Tree Using Point to Point Routing Records" application Ser. No. 09/906,937); "Methods and Arrangements for Building a Subsource Address Multicast Distribution Tree Using Network Bandwidth Estimates" application Ser. No. 09/906,939); "Methods and Arrangements for Dynamically Modifying Subsource Address Multicast Data Distribution Trees" application Ser. No. 09/906,596); "Methods and Arrangements for Establishing a Group Collaboration Session Utilizing Multiple Multicast Distribution Trees" application Ser. No. 09/906,935); and "Methods and Arrangements for Multicasting a Data Stream at Different Data Rates to Groups of Subscribers" application Ser. No. 09/906,938).

Throughout the present disclosure, various terms are utilized that are generally well-known to those of ordinary skill in the art. However, for the purposes of providing additional clarity, a number of such terms are briefly defined immediately herebelow. (Though one or more of the terms may well be defined elsewhere herein, it is deemed useful at this juncture to gather all of the following terms in one place, to provide a glossary of sorts that may serve, when needed, as a convenient and easily discernible reference point.)

A "data distribution path" is defined as the sequence of routing nodes which a specific message traverses from the moment that it originates in a publisher node to the moment that it arrives in a receiver node.

A "node" is a general vertex in the multicast distribution tree. There are three specific types of nodes in a SAM tree: the publisher node, which is the root of the tree, the intermediate nodes, which are the nodes with child nodes which are not the root node, and the leaf nodes, which are nodes without any children nodes. The term node is used in this embodiment to generally refer to any of type of node in the SAM tree.

As employed herein, the term "package switching operation" is used to refer to the operation performed by intermediate nodes, also called router nodes, in the data distribution path of a given data transmission. This operation involves receiving the data package and then making a decision of where to retransmit it, if necessary. This decision is made utilizing data that is stored in the proximity of the router node, generally referred to as routing tables. After the routing table are consulted, a package switching node will retransmit (switch) a package to either another intermediate router node or the final receiver of the package.

The term "piece wise point to point" is used to describe the way in which the SAM technology exploits the underlying point to point network protocol in multicasting a message to a plurality of receivers. A SAM message originates at the root node and is addressed with the point to point address of either a final receiver node or an intermediate router node. Whenever an intermediate router node receives a SAM message, it will retransmit it to one or more point to point addresses, of either final receivers or intermediate nodes. This operation is repeated until the message finally reaches a final receiver, or leaf node in the SAM tree. Therefore, a single message is transmitted to a variety of receivers utilizing different point to point addresses along the transmission path. It can thus be said that SAM transmissions are always made using the point to point mode of transmission at every step (piece) of the transmission path, and that the transmission pattern is therefore piece wise point to point.

The term "point of divergence" refers to a node in the SAM tree which has more than one descendant node to which it has to route a given message.

The term "point to point" is used to refer to a transmission mode in which a given message is transmitted from a single source (or point) to a single receiver. Typically, communication networks only support point to point protocols, the most prevalently used being the Internet Protocol (IP) and the Asynchronous Transfer Mode (ATM) protocols. Other modes of transmission are possible, such a broadcast and multicast. Such protocol can be implemented extensions of the underlying (basic) point to point protocol.

The term "point to point address" refers to a network address utilized by basic point to point protocol provided by the communications network.

The term "protocol tunneling" refers to a technique which makes possible to transmit a data package encoded by a given protocol in a network which does not offer direct support for the protocol. The technique involves the encapsulation of the data package into a data segment which is addressed utilizing the basic point to point protocol supported by the network. The package is then transmitted from to a node which is able to receive and process it. These two nodes are referred to as the end points of the tunnel. The receiving node is then able decapsulate the original data package and retransmit it further. Eventually, the package arrives at a network which offers native support for the protocol.

A "publisher node" is a node which is a source of a given information. In SAM, messages are multicasted to a plurality of receivers utilizing a distribution tree, named the SAM tree, which is rooted at the publisher node.

The term "predicate" is used to refer to an additional data field used by SAM to extend the addressing capability of an underlying point to point protocol. This field is used by applications to store data which is used to define specific subsets of the information that originates from a publisher node.

The term "router node" is used to refer to a node which retransmits a given data package such that it can reach a specific final destination. The term "package switching node" is synonymous with this term.

"SAM" is an abbreviation for "Subsource Addressing Multicast".

The term "SAM protocol" refers to the collection of methods and operations which are used by source nodes to express interest in the subsets of information published by a given source, and by the source of information to publish message to subsets of subscribers.

The "SAM tree" is a data structure utilized to multicast messages from the node which is the source of the tree. The intermediate nodes (nodes without children) of the SAM tree are nodes which are capable of routing SAM messages to any of their descendants. The leaf nodes (nodes without children) are nodes that are final receivers of SMA messages. It is also possible for an intermediate node to be a final receiver of a SAM message.

The term "shared paths" is used in reference to the intersection of transmission path segments for a message addressed to a plurality of subscribers. In this embodiment this term is used in reference to both point to point and multicast routing paths. A point to point shared transmission path between two receivers of a message occurs when the routing decisions taken by the underlying point to point protocol define paths that traverse the same sequence of routing nodes for some portion of the paths. Similarly, a multicast shared path is an equal sequence of multicast routing nodes in the transmission paths for messages destined for multiple multicast addresses. In the field of multicast communications, performance gains are realized by exploiting common transmission paths, or shared paths, in both the point to point and the multicast package switching infrastructure.

The term "subsource addressing multicast" is used to collectively refer to a set of technologies which make possible for a source of information to multicast messages to any given subset of its receivers. This technology includes the SAM protocol and the SAM tree discussed above.

As employed herein, a "subscriber" is a node which has posted at least one subscriber operation, and a final receiver of SAM messages.

The term "tunneling" refers to the act of deploying a protocol tunnel (described above) for the transmission of a message.

The term "underlying protocol" is used to refer to the basic point to point protocol supported by the communications network.

At least one presently preferred embodiment of the present invention broadly embraces a multicast distribution tree capable of realizing multiple distribution paths. The distribution tree may be referred to as a Subsource Addressing Multicast tree, or a SAM tree. As described herebelow, the SAM tree is capable of realizing optimal distribution paths for any subset of the nodes of a given source which is the root of the tree. The tree is preferably configured such that it can be deployed as an extension of any underlying point to point protocol.

In accordance with at least one presently preferred embodiment of the present invention, the SAM multicast distribution tree is distinguished from other distribution trees because any given intermediate node can propagate a message not only to its direct descendants, but also to any number of indirect descendants. Therefore, in addition to keeping the basic state information which is required from a multicast distribution tree, such as parent and direct descendant information, each intermediate node in the tree also keeps data related to the propagation to indirect descendants. In other words, the SAM multicast tree can be used to propagate messages in a plurality of paths. In actuality, the SAM trees allows for the all possible combinations of data transfer paths between the root node of the tree and all possible subsets of its descendants. The SAM tree can therefore be utilized to support a very fine grained addressing scheme, such as the SAM protocol.

FIG. 1 illustrates a SAM tree and a few of the possible paths for data propagation from the node S0, denoted by the dotted arrows. Not all possible paths are shown, so as not to impair the clarity of the illustration. Each parent node is capable of sending a message directly or via a protocol tunnel to any of its descendants. The collection of all possible subpaths generate a distribution mesh capable of efficiently multicasting messages to any subset of receivers making optimum use of the shared transmission paths among receivers.

The data propagation patterns determined by the SAM propagation tree are preferably such that a message destined for multiple nodes will incur a minimum number of retransmissions. In one embodiment, his is achieved by forcing the retransmissions to occur only at the points of divergence in the propagation path. This will result in the optimal utilization of shared paths among the subsets of receivers of the message. The direct transmission of a message from a parent node to its descendants can be made via a protocol tunnel, which will result in further gains in performance.

Preferably, the SAM tree includes a root node PI, which is the publisher of information, and a set of nodes (e.g., S0-S22) which are either direct or indirect descendants of the root node P1. The descendants of the root node P1 can be either the final destination of notification messages or intermediate router nodes. A router node is a node is capable of forwarding notification messages to other router nodes or subscriber nodes. A subscriber node is a node which is a final destination for a notification message. A router node may be a subscriber node as well as a router node.

As previously mentioned, multicast capability is usually added to a network as an extension of some previously existing point to point protocol. Preferably, the SAM tree is configured such that it makes an optimal use of the existing point to point message switching infrastructure. When a parent node in the SAM tree relays a message to one if its descendants utilizing the descendant's point to point address directly, it is avoiding the overhead of making several package switching operation at each intermediate node in the path from the parent to the descendant.

Since SAM extends the addressing capability of the underlying point to point protocol, it involves two kinds of data switching operations:
  i. the basic point to point package switching operation
  ii. the extended multicast package switching operation, which is performed by the nodes in the network which function as SAM routers.

The direct addressing capability of the SAM tree results in a savings of both kinds of package switching operations, which makes SAM a very efficient multicast package switching infrastructure.

Preferably, the SAM communication infrastructure keeps specific state information in every node which participates in a SAM network. Accordingly, each node in a SAM network preferably keeps the following state:
  i. Point to Point Address of the parent node
  ii. Point to Point Address of each child node
  iii. SAM distribution lists for any of the subsets of the node's descendants In a preferred embodiment, the distribution lists are identified by a predicate field, which extends the addressing capability of the underlying point to point protocol. This extra field is utilized by the specific application which uses the SAM protocol to identify subsets of receivers of the published information. The utilization of an application specific predicate field as a network address is a unique characteristic embraced herein.

The aforementioned embodiment carries out a preferred implementation of the SAM tree utilizing subscription and notification operations which utilize the predicate field. Here, an implementation utilizing the IP protocol as the underlying point to point protocol is discussed, but it should be understood that any similar implementation utilizing any other underlying protocol will not deviate from the spirit or scope of the present invention.

Preferably, the network addresses in SAM are defined by a pair of the following format:

<source,predicate> where:
  i. The address of a source of information is itself expressed as a pair of the format [host address, port number]. The host address conforms to the addressing scheme of the underlying point to point protocol. In a sample implementation using TCP/IP this address can be given in dotted decimal format, or alternatively as a host name which can be mapped into a network address, and the port number refers to a communication port which is bound to the publisher process.
  ii. The predicate field is utilized by the subscribers to specify a predicate which is interpreted by the publisher process to select a subset of the information stream.

(Though it is feasible to implement SAM over a variety of network protocols, the present discussion will be limited to implementation based on TCP/IP.)

For example, suppose that the publisher provides an information stream including an integer series which is updated at every second. For the present discussion, this information stream may be labeled "the value of X".

Assume now that a subscriber process wants to receive the current value of X, which is published by node P1 at port 7777, but only if X is greater than 130. In SAM, it is possible to express this specific interest with the following network address:

<P1:7777,"X>130">

In another example, the values of the X series indicate unique identifiers which label data items. Therefore, the subscriber could express the desire to receive updates of an item numbered 12345, published by P1 at port 8888, utilizing the following SAM address:

<P1:8888,"X=12345">

The SAM predicate value is preferably handled as a binary value which extends the IP network address, therefore "refining" the granularity of the addressability. It is therefore possible for subscribers to utilize any value, as long as this value can be understood by the publisher of the information. The routers using the SAM protocol have no semantic understanding of the predicates they are handled exactly as network addresses. This allows SAM to be utilized by essentially any type of publisher system, even supporting different lengths in the predicate field.

The disclosure now turns to a discussion of methods which are employed by the nodes of the SAM tree which have the purpose of maintaining a connection to the publisher node. Such methods involve, in accordance with at least one presently preferred embodiment of the present invention, constantly probing each parent node and also the publisher node at regular intervals such that the quality of the connection can be assured. The polling operation should preferably be reduced so as to avoid the unnecessary processing of messages by the nodes of the SAM tree, and also to avoid consuming excessive network bandwidth. Therefore, described herebelow is a "Quality of Service" (QoS) infrastructure and methods that are used to limit the amount of polling operations and that can be used to control the quality of message reception at each node individually.

Preferably, two types of monitoring methods will be utilized for maintaining an active SAM connection: parent node monitoring and quality of service monitoring. Both methods are described herebelow.

The task of monitoring the nodes of the SAM tree is shared by all nodes in the tree. Each node is responsible for continuously monitoring the health of the network communications with its parent node. In order to verify the health of the network path, each child node sends a verification message to its parent node at a regular interval. Because every node monitors its ability of communicating with the parent node, each subscriber is assured that there is a healthy communication link between it and the publisher node. In the event that a parent node fails to reply to a verification message, the child node will contact the publisher node directly and request to be reinserted in the SAM tree. These actions are preferably executed at each child node by a separate monitoring thread of execution, as shown in FIG. 2.

Figure 2:
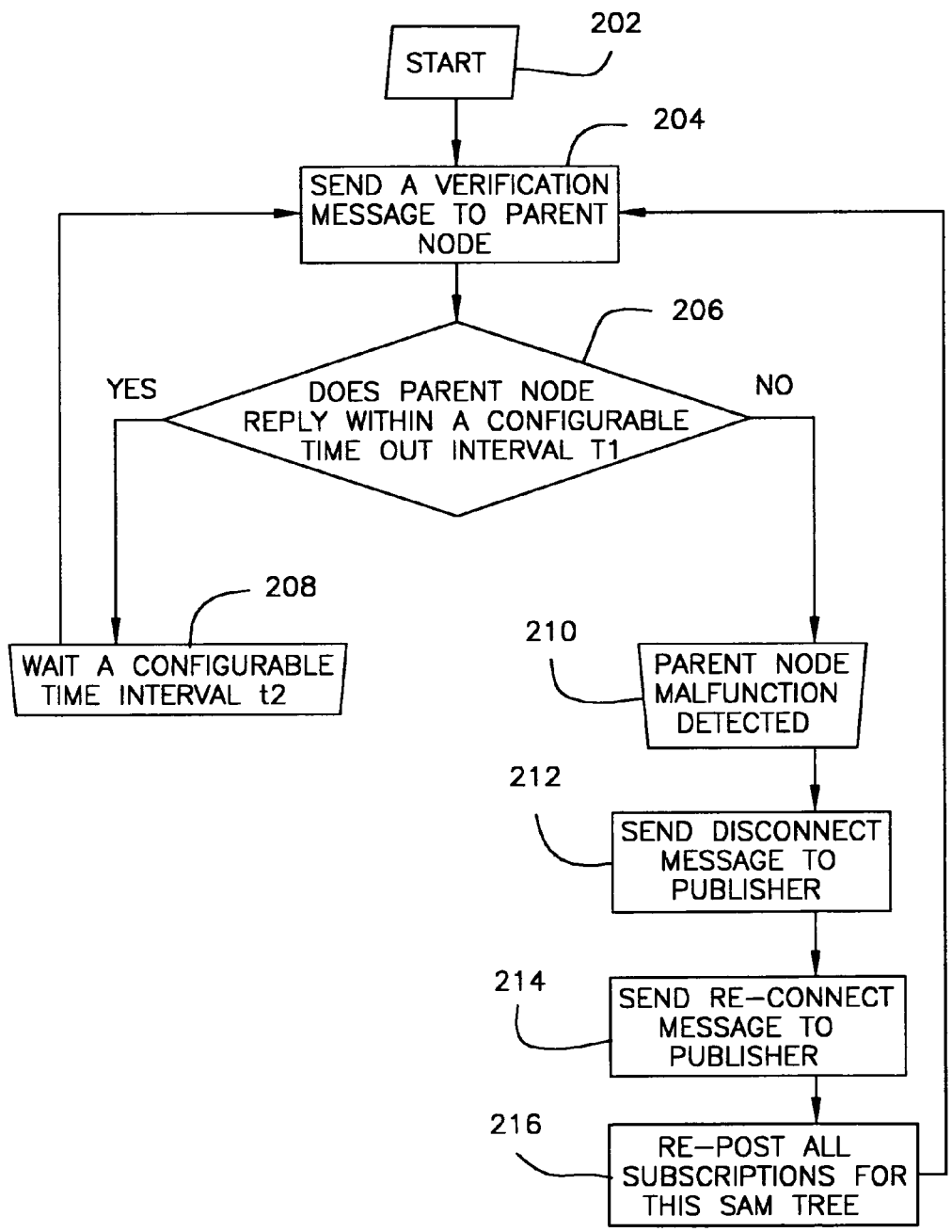
FIG. 2 schematically illustrates a parent node monitoring process.

Thus, as shown in FIG. 2, such a monitoring process starts at 202. At 204, a verification message is sent to the parent node. At 206, it is queried as to whether the parent node replies within a configurable time-out interval t1. If yes, then at 208 there is a wait over a configurable time interval t2, and the process returns to 204. If no, then at 210, it is understood that a parent node malfunction is detected. At 212, a disconnect message is sent to the publisher, while at 214 a re-connect message is sent to the publisher. At 216, all subscriptions for the SAM tree in question are reposted. The process then returns to 204.

In addition to the basic parent node monitoring capability, it is possible for subscriber nodes to indicate if it requires additional monitoring with the objective of detecting changes in the underlying point to point network that could improve its reception of the multicasted messages. For example, it is possible that at the time that a SAM connection was established by a given subscriber a few of the point to point router nodes were not active, and therefore the node was not appropriately placed in the SAM tree. The router elements that were defective are fixed, it is necessary to detect that new routing paths are available and to make changes in the SAM tree accordingly. The publisher node is able to detect when a better position for a given subscriber becomes available by recomputing a node placement operation (such as any of those discussed in the copending and commonly owned U.S. patent applications filed concurrently herewith, supra) for a given subscriber. Nevertheless, the computation of the node placement operation can be expensive and computing it repeatedly for all nodes in a SAM tree may be construed as a waste of resources. Therefore, a quality of service parameter is preferably included in the request for SAM connections which indicates if the node placement procedure should be recomputed and how often it should be repeated. The following are the possible values of the quality of service parameter q, and their semantic meaning:

i. if q=0 the node does not require neither parent node monitoring nor QoS monitoring.

ii. if q=1 the node requires parent node monitoring and QoS monitoring at an interval t iii. if q=2 the node requires parent node monitoring and QoS monitoring only when it detects a degradation in the reception of messages that originate at the publisher node.

iv. if q=3 the subscriber node requires only parent node monitoring.

Figure 3:
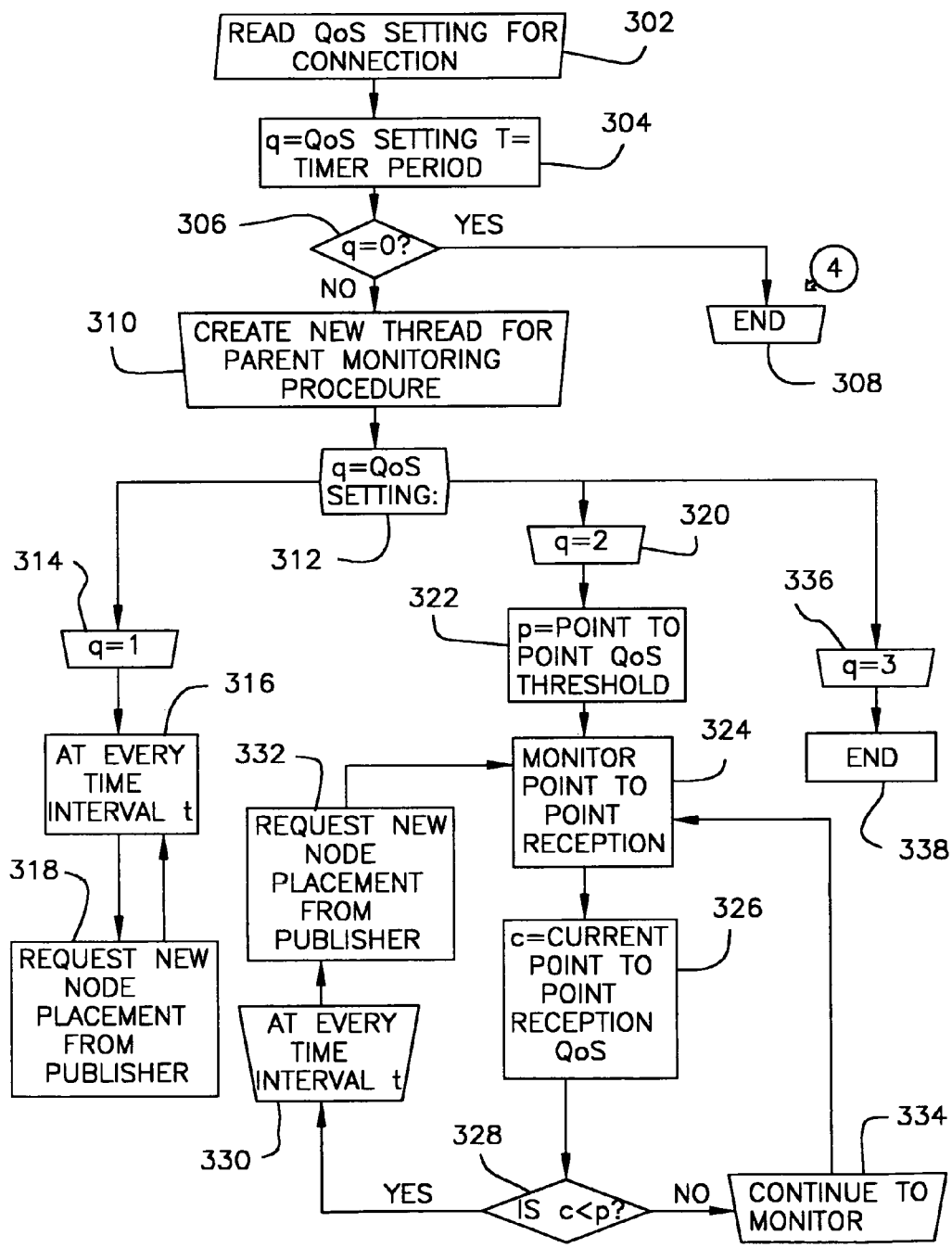
FIG. 3 schematically illustrates a process for "quality of service" enforcement.

These values are preferably utilized by both subscriber nodes and intermediate node in order to specify the importance of their placement in the SAM tree. Nodes which can tolerate a slight degradation in message reception should preferably not specify a small interval for QoS monitoring, whereas nodes for which correct placement is vital should specify QoS monitoring with a small monitoring interval. FIG. 3 illustrates how the QoS parameter is interpreted by the SAM nodes and the actions taken for each choice, in accordance with at least one presently preferred embodiment of the present invention.

As shown in FIG. 3, at 302 the QoS setting is read. At 304, q is assigned as the QoS setting and t is assigned as the timer period. At 306, it is queried as to whether q is 0. If yes, then at 308 the process ends. If no, then at 310 a new thread is created for the parent monitoring procedure. At 312, the value of q is then ascertained. If equal to 1 (314), then at 316/318, a new node placement is requested from the publisher at every time interval t. As shown by the two-way arrows, this process is repeated at every time interval t (e.g., 1 sec.) for as long as the process is running. If q is equal to 2 (320), then at 322, p is assigned as the point to point QoS threshold. At 324, point to point reception is monitored. At 326, c is assigned as the current point to point reception QoS. At 328, it is queried as to whether c is less than p. If yes, then at 330/332, a new node placement is requested from the publisher at every time interval t. The process then returns to 324.

If the answer to the query at 328 is "no", then at 334, monitoring is continued and the process returns to 324.

If, at 312, q is ascertained as being greater than 2 (336), then the process ends at 338.

It is to be understood that the present invention, in accordance with at least one presently preferred embodiment, includes an arrangement for designating at least one of the nodes as at least one subscriber node, an arrangement for designating a parent node for each subscriber node, and an arrangement for prompting at least one subscriber node to ascertain the integrity of an interconnection with at least one parent node. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of monitoring at least one interconnection between at least two nodes in a distributed network, said method comprising the steps of:

designating at least one of the nodes as at least one subscriber node, wherein the subscriber node selects a subset of information using a predicate field;

designating a parent node for each subscriber node;

prompting at least one subscriber node to ascertain the integrity of an interconnection with at least one parent node, wherein said prompting step comprises periodically prompting the subscriber node to send a verification message to the parent node to ascertain the integrity of an in interconnection with the parent node; and selectively ascertaining a quality of service associated with the at least one subscriber node;

wherein said step of ascertaining the quality of service comprises the subscriber node specifying a quality of service parameter value to specify an importance of placement of the subscriber node in the network.

2. The method according to claim 1, further comprising the steps of:

designating one of the nodes as a publisher node, the publisher node and at least one subscriber node fanning a distribution tree; and prompting at least one subscriber node to request reinsertion in the distribution tree upon the failure of at least one parent node to respond to a verification message.

3. The method according to claim 1, wherein:

said at least one subscriber node comprises at least two subscriber nodes;

said prompting step comprising periodically prompting each subscriber node to ascertain the integrity of an interconnection between each subscriber node and its parent node.

4. The method according to claim 1, wherein the quality-of-service parameter indicates at least whether the integrity of an interconnection with at least one parent node is to be ascertained.

5. The method according to claim 1, wherein the quality-of-service parameter indicates at least whether the viability of reattaching at least one subscriber node to another node is to be ascertained.

6. The method according to claim 1, wherein the quality-of-service parameter indicates at least whether at least one of the following is to be ascertained at predetermined time intervals: the integrity of an interconnection with at least one parent node and the viability of reattaching at least one subscriber node to another node.

7. The method according to claim 1, wherein the quality-of-service parameter indicates at least whether at least one of the following is to be ascertained solely upon detection of a degradation in the reception of messages originating from the publisher node: the integrity of an interconnection with at least one parent node and the viability of reattaching at least one subscriber node to another node.

8. An apparatus for monitoring at least one interconnection between at least two nodes in a distributed network, said apparatus comprising:
  an arrangement for designating at least one of the nodes as at least one subscriber node, wherein the subscriber node selects a subset of information using a predicate field;
  an arrangement for designating a parent node for each subscriber node;
  an arrangement for prompting at least on subscriber node to ascertain the integrity of an interconnection with at least one parent node, wherein said prompting arrangement is adapted to periodically prompt the subscriber node to send a verification message to the parent node to ascertain the integrity of an in interconnection with the parent node; and
  an arrangement for selectively ascertaining a quality of service associated with at least one subscriber node;
  wherein said arrangement for ascertaining the quality of service comprises the subscriber node specifying a quality of service parameter value to specify an importance of placement of the subscriber node in the network.

9. The apparatus according to claim 8, further comprising:
  an arrangement for designating one of the nodes as a publisher node, the publisher node and at least one subscriber node forming a distribution tree; and
  an arrangement for prompting at least one subscriber node to request reinsertion in the distribution tree upon the failure of at least one parent node to respond to a verification message.

10. The apparatus according to claim 8, wherein:
  said at least one subscriber node comprises at least two subscriber nodes;
  said prompting arrangement is adapted to periodically prompt each subscriber node to ascertain the integrity of an interconnection between each subscriber node and its parent node.

11. The apparatus according to claim 8, wherein the quality-of-service parameter indicates at least whether the integrity of an interconnection with at least one parent node is to be ascertained.

12. The apparatus according to claim 8, wherein the quality-of-service parameter indicates at least whether the viability of reattaching at least one subscriber node to another node is to be ascertained.

13. The apparatus according to claim 8, wherein the quality-of-service parameter indicates at least whether at least one of the following is to be ascertained at predetermined time intervals: the integrity of an interconnection with at least one parent node and the viability of reattaching at least one subscriber node to another node.

14. The apparatus according to claim 8, wherein the quality-of-service parameter indicates at least whether at least one of the following is to be ascertained solely upon detection of a degradation in the reception of messages originating from the publisher node: the integrity of an interconnection with at least one parent node and the viability of reattaching at least one subscriber node to another node.

15. A computer readable medium readable by a computer, tangibly embodying a program of instructions executable by the computer to perform method steps for monitoring at least one interconnection between at least two nodes in a distributed network, said method comprising the steps of:
  designating at least one of the nodes as at least one subscriber node, wherein the subscriber node selects a subset of information using a predicate field;
  designating a parent node for each subscriber node;
  prompting at least one subscriber node to ascertain the integrity of an interconnection with at least one parent node, wherein said prompting step comprises periodically prompting the subscriber node to send a verification message to the parent node to ascertain the integrity of an in interconnection with the parent node; and
  selectively ascertaining a quality of service associated with the at least one subscriber node;
  wherein said step of ascertaining the quality of service comprises the subscriber node specifying a quality of service parameter value to specify an importance of placement of the subscriber node in the network.

* * * * *